United States Patent
Amirmazlaghani et al.

(10) Patent No.: US 11,128,648 B2
(45) Date of Patent: Sep. 21, 2021

(54) GENERALIZED LIKELIHOOD RATIO TEST (GLRT) BASED NETWORK INTRUSION DETECTION SYSTEM IN WAVELET DOMAIN

(71) Applicants: Maryam Amirmazlaghani, Tehran (IR); Sajjad Hosseinzadeh, Mashhad (IR)

(72) Inventors: Maryam Amirmazlaghani, Tehran (IR); Sajjad Hosseinzadeh, Mashhad (IR)

(73) Assignees: Maryam Amirmazlaghani, Tehran (IR); Sajjad Hosseinzadeh, Mashhad (IR); AMIRKABIR UNIVERSITY OF TECHNOLOGY, Tehran ( * ) Notice: Subject to any disclaimer, the term of this patent is extended or adjusted under 35 U.S.C. 154(b) by 325 days.

(21) Appl. No.: 16/237,364

(22) Filed: Dec. 31, 2018

(65) Prior Publication Data
US 2019/0158522 A1   May 23, 2019

(30) Foreign Application Priority Data
Jan. 2, 2018 (IR) .................. 139650140003011760

(51) Int. Cl.
*H04L 29/06* (2006.01)
*G06F 17/18* (2006.01)
(Continued)

(52) U.S. Cl.
CPC .......... *H04L 63/1425* (2013.01); *G06F 17/18* (2013.01); *G06K 9/00* (2013.01);
(Continued)

(58) Field of Classification Search
CPC . H04L 63/1416; H04L 63/1425; H04L 63/20; G06F 17/18; G06K 9/00; G06N 5/045; G06N 7/005
See application file for complete search history.

(56) References Cited

U.S. PATENT DOCUMENTS 6,405,318 B1   6/2002   Rowland
7,366,148 B2   4/2008   Muaddi
(Continued)

*Primary Examiner* — Jeffrey C Pwu
*Assistant Examiner* — Thong P Truong
(74) *Attorney, Agent, or Firm* — NovoTechIP International PLLC

(57) ABSTRACT

An improved system and method for detecting network anomalies comprises, in one implementation, a computer device and a network anomaly detector module executed by the computer device arranged to electronically sniff network traffic data in an aggregate level using a windowing approach. The windowing approach is configured to view the network traffic data through a plurality of time windows each of which represents a sequence of a feature including packet per second or flow per second. The network anomaly detector module is configured to execute a wavelet transform for capturing properties of the network traffic data, such as long-range dependence and self-similarity. The wavelet transform is a multiresolution transform, and can be configured to decompose and simplify statistics of the network traffic data into a simplified and fast algorithm. The network anomaly detector module is also configured to execute a bivariate Cauchy-Gaussian mixture (BCGM) statistical model for processing and modeling the network traffic data in the wavelet domain. The BCGM statistical model is an approximation of α-stable model, and offers a closed-form expression for probability density function to increase accuracy and analytical tractability, and to facilitate parameter estimations when compared to the α-stable model. Finally, the network anomaly detector module is
(Continued)

further configured to execute a generalized likelihood ratio test for detecting the network anomalies.

15 Claims, 3 Drawing Sheets

(51) Int. Cl.
    *G06N 7/00*     (2006.01)
    *G06K 9/00*     (2006.01)
    *G06N 5/04*     (2006.01)

(52) U.S. Cl.
    CPC .............. *G06N 5/045* (2013.01); *G06N 7/005* (2013.01); *H04L 63/1416* (2013.01); *H04L 63/20* (2013.01)

(56) References Cited

U.S. PATENT DOCUMENTS

| | | |
|---|---|---|
| 7,603,711 B2 | 10/2009 | Scheidell |
| 9,680,693 B2 | 6/2017 | Barford et al. |
| 2004/0025044 A1 | 2/2004 | Day |
| 2011/0154119 A1* | 6/2011 | Wang .................... G06F 11/006 714/37 |
| 2012/0317306 A1 | 12/2012 | Radinsky et al. |
| 2014/0041032 A1 | 2/2014 | Scheper et al. |
| 2018/0115578 A1* | 4/2018 | Subbarayan ........... G06N 20/00 |

* cited by examiner

GENERALIZED LIKELIHOOD RATIO TEST (GLRT) BASED NETWORK INTRUSION DETECTION SYSTEM IN WAVELET DOMAIN

CROSS REFERENCE TO RELATED APPLICATION

This application claims the benefit of priority to Iran Application Serial Number 139650140003011760, filed on Jan. 2, 2018, the entire content of which is incorporated herein by reference.

TECHNICAL FIELD

The present disclosure relates generally to a system for detecting network anomalies, more particularly, to a system and method for detecting network anomalies using a bivariate Cauchy-Gaussian mixture statistical model and a generalized likelihood ratio test in wavelet domain.

BACKGROUND

Anomaly detection is a known technique for finding anomalous patterns in network traffic that do not conform to a well-defined notion of normal behavior. Such detection often provides network administrators with an additional source of information to diagnose network behavior or to locate the root of network faults. Anomaly detection finds extensive use in a wide variety of application domains, such as fraud detection for credit cards, insurance or health care, intrusion detection for computer network security (cybersecurity), fault detection in operating critical environments, and military surveillance for enemy activities.

As the number of users within a particular entity grows, the risks for unauthorized intrusions into computer systems could increase, and as such, a reliable and secure computer network, regardless of the network size, must be maintained. To improve overall security of computer systems, anomaly detection technologies are becoming extremely important to identify when a computer network has been breached, and a cybersecurity activity has been transpired. Anomalies in network traffic can indicate whether a network is under attack, and a malicious activity is underway. For instance, abnormal traffic signals on a computer network can indicate that a computer on the network is infected and possibly divulging secure or private information.

Often times, however, there exist challenges associated with commonly used anomaly detection techniques including: defining a normal region which encompasses every possible normal behavior; imprecision in the boundary between normal and anomalous behavior; difficulty in detecting malicious adversaries due to their adaptation to make the anomalous observations appear like normal; evolution of normal behavior definition and difficulty in detecting future abnormalities; limited availability of labeled data for training/validation of models used by anomaly detection techniques; defining exact notion of an anomaly which may differ for different application domains; and similarity of data noise to actual anomalies and difficulties to distinguish the two. As a result, solutions to these challenges rely on making assumptions about the form of the data, the form of an anomaly, or both.

With all these challenges, there remains a need for an improved network intrusion detection system that can detect accessibility violation in different scenarios while operating in a fast and reliable fashion. It is well-known that different statistical models can be utilized to assess a likelihood of observing a particular pattern in network traffic, and classifying such pattern as either normal or anomalous. While, the compatibility between the applied statistical models and the network traffic is of great importance, the complexity of such models should not be elevated. For instance, absence of closed-form expressions for probability density functions used in such models often leads to applying numerical methods and thereby, impairing overall accuracy of such analyses.

Accordingly, the present disclosure addresses providing an improved wavelet domain system for detecting network anomalies using a statistical model called bivariate Cauchy-Gaussian mixture with a closed-form expression for probability density function, and a generalized likelihood ratio test in wavelet domain while offering a fast and reliable method for parameter estimations.

SUMMARY

In one general aspect, described is an improved wavelet domain system and method for detecting network anomalies using a bivariate Cauchy-Gaussian mixture statistical model and a generalized likelihood ratio test in wavelet domain. In one implementation, the improved system may include a computer device and a network anomaly detector module being executed by the computer device.

In an aspect, the computer device can be arranged to electronically collect and sniff network traffic data in an aggregate level using a windowing approach. The windowing approach can be configured to view the network traffic data through a plurality of time windows each of which may represent a sequence of a feature including packet per second or flow per second. Each time window may be analyzed individually, and configured to have overlaps with neighboring time windows to increase accuracy in specifying positions of the network anomalies and preventing sudden changes of an inference step.

In a related aspect, the network anomaly detector module can be configured to execute a wavelet transform for capturing properties of the network traffic data, such as long-range dependence and self-similarity. The wavelet transform is a multiresolution transform, and can be configured to decompose and simplify statistics of the network traffic data into a simplified and fast algorithm. Depending on network traffic conditions, different families of the wavelet transform can be used. In an aspect, the wavelet transform can be Daubechies wavelets, and configured to solve a broad range of problems, such as capturing self-similarity.

In a further aspect, the network anomaly detector module can also be configured to execute a bivariate Cauchy-Gaussian mixture (BCGM) statistical model for processing and modeling the network traffic data in the wavelet domain. The BCGM statistical model may be an approximation of $\alpha$-stable model, and can offer a closed-form expression for probability density function (pdf) to increase accuracy and analytical tractability, and to facilitate parameter estimations when compared to the $\alpha$-stable model. Compatibility between the BCGM statistical model and the network traffic data in the wavelet domain can be investigated by comparing histogram of the network traffic data and the pdf or by applying a Kolmogrov-Smirnov test.

In another aspect, the network anomaly detector module can be further configured to execute a generalized likelihood ratio test for classifying patterns in the network traffic data as either normal or abnormal. The anomalies can be further reported to a user of the computer device.

The foregoing and other objects, features, aspects, and advantages of the present invention will become more apparent from the following detailed description of the present application when taken in conjunction with the accompanying drawings.

BRIEF DESCRIPTION OF THE DRAWINGS

Features of the subject technology are set forth in the appended claims. However, for purpose of explanation, several implementations of the subject technology are set forth in the following figures.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings. As part of the description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

Figure 1:
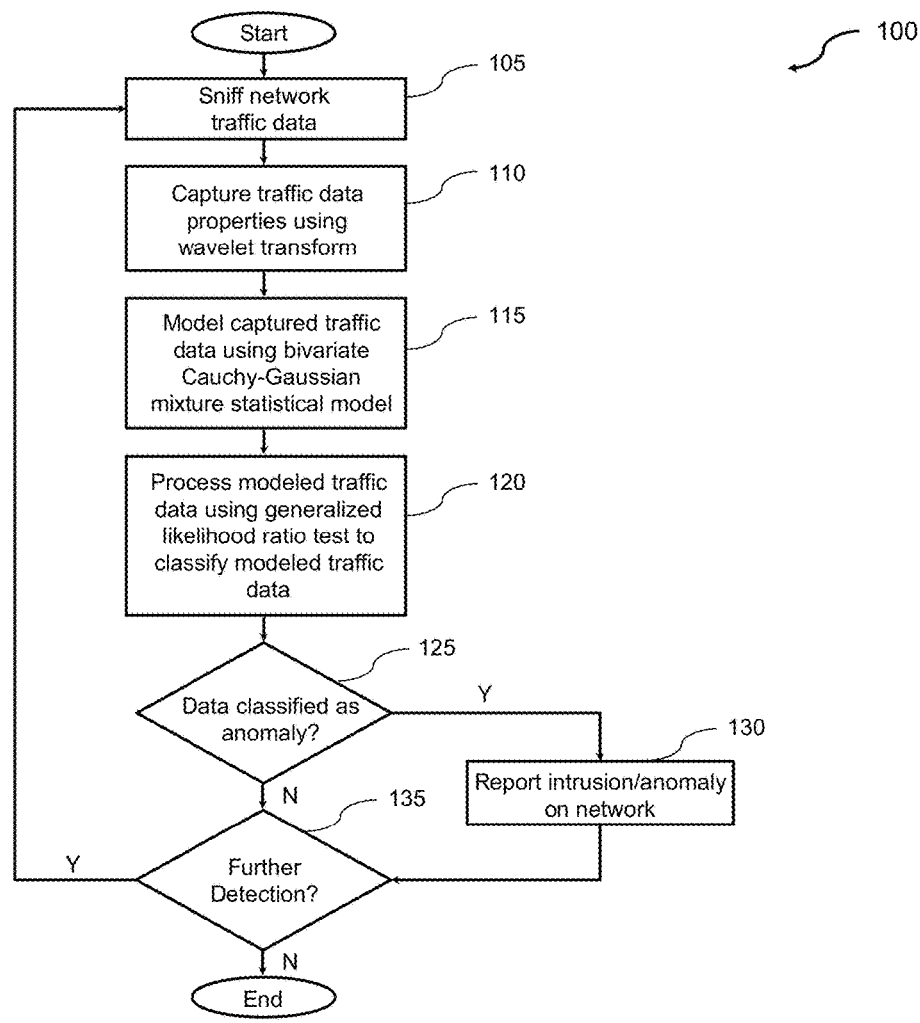
FIG. 1 is a flowchart showing overall operational steps for detecting network anomalies carried out by an improved network intrusion detection system, in accordance with one or more implementations.

A solution is proposed herein to resolve the above-motioned issues and others by providing an improved system for detecting network anomalies using a bivariate Cauchy-Gaussian mixture statistical model and a generalized likelihood ratio test in wavelet domain. Principles of the present invention will now be described in detail with reference to the examples illustrated in the accompanying drawings and discussed below. To detect and identify network anomalies in a fast and reliable fashion, an improved network intrusion detection system, in accordance with aspects of the invention, is described herein. FIG. 1 is a flowchart showing overall operational steps 100 for detecting network anomalies carried out by the improved network intrusion detection system (hereinafter "system"). The system may operate based on a basic assumption that normal vs. abnormal behavior of a computer device can occur respectively at high and low probability regions of a stochastic model.

In one implementation, beginning in step 105, the computer device can be arranged to electronically collect and sniff network traffic data periodically and/or in real time. The network traffic data can be sniffed either in an aggregate level or in a packet level. In an aspect, the network traffic data may be sniffed in the aggregate level to facilitate intrusion detection when it comes to large networks. Sniffing the network traffic data in the aggregate level may require using a windowing approach, as shown in more detail in FIG. 2.

In one implementation, in step 110, a wavelet transform may be executed by the system for capturing properties of the network traffic data, such as long-range dependence and self-similarity. The wavelet transform is a multiresolution transform, and can be configured to decompose and simplify statistics of the network traffic data into a simplified and fast algorithm. Depending on network traffic conditions, different families of the wavelet transform can be used. In an aspect, the wavelet transform can be Daubechies wavelets, and configured to solve a broad range of problems, such as capturing self-similarity.

In one implementation, a binary hypothesis test can be used to formulate intrusion detection in the network traffic data. In an aspect, $H_0$ hypothesis may be assigned for normal traffic and $H_1$ for abnormal traffic. According to the Neyman-Pearson criteria, it is well-known that intrusion detection based on a likelihood ratio test (LRT) is optimal. As such, to use the LRT, the network traffic data in the wavelet domain is statistically modeled, as discussed below.

In one implementation, in step 115, the bivariate Cauchy-Gaussian mixture (BCGM) statistical model may be executed by the system for processing and modeling the network traffic data in the wavelet domain. The BCGM statistical model may be an approximation of α-stable model, which can offer a closed-form expression for probability density function (pdf) to increase accuracy and analytical tractability, and to facilitate parameter estimations when compared to the α-stable model. The pdf of the BCGM statistical model is obtained according to the following equation.

$$f_{BCGM}(x, \theta) = (1-\varepsilon)f_G + \varepsilon f_C \quad (1)$$

$$f_G(x) = N(\mu, \sigma^2) = \frac{1}{\sigma\sqrt{2\pi}} e^{-\frac{(x-\mu)^2}{2\sigma^2}} \quad (2)$$

$$f_C(x) = f(x, x_0, \gamma) = \frac{1}{\pi\gamma\left[1 + \left(\frac{X-x_0}{\gamma}\right)^2\right]} \quad (3)$$

$$\theta = [\mu, \sigma, x_0, \gamma, \varepsilon] \quad (4)$$

In Equation (1) through Equation (4), $f_{BCGM}(x, \theta)$, $f_G(x)$ and $f_C(x)$ represent the pdf of the BCGM, Gaussian and Cauchy distributions, respectively; ε is mixture weight parameter and bounded in $0 \leq \varepsilon \leq 1$; x is the network traffic data in the wavelet domain; and θ is vector of the statistical model parameters where [μ, σ] and [$x_0$, γ] are the parameters of the Gaussian and Cauchy distributions, respectively.

In one implementation, the parameters of the BCGM statistical model can be estimated using a maximum likelihood approach (ML) due to the desirable asymptotic properties of such estimate and because Internet applications can involve very large amount of data. However, since there exists no closed form expression for the ML estimation, two different approaches may be considered for such estimation: (i) applying numerical optimization methods or (ii) using expectation maximization (EM) algorithm.

In one implementation, performance of the network intrusion detection system may depend on efficiency of the BCGM statistical model for the network traffic data in the wavelet domain. As such, to verify the efficiency of the BCGM statistical model for different traffic data sets, different compatibility tests may be applied. In an aspect, the compatibility between the BCGM statistical model and the network traffic data in the wavelet domain can be investigated by comparing histogram of the network traffic data and the pdf the BCGM statistical model, or by applying a Kolmogrov-Smirnov (KS) test.

In one implementation, comparison between the histogram of the network traffic data in the wavelet domain and the pdf the BCGM statistical model can be done in different ways, such as by using a visual comparison or by computing a mean square error and comparing such error with a threshold. If the mean square error is less than the threshold, the compatibility between the BCGM statistical model and the network traffic data in the wavelet domain is confirmed, otherwise is rejected.

In one implementation, the KS test compares a maximum absolute error between an empirical cumulative distribution function (cdf) of the network traffic data in the wavelet domain and a cdf of the BCGM statistical model with a threshold. If the maximum absolute error is less than the threshold, the compatibility between the BCGM statistical model and the network traffic data in the wavelet domain is confirmed, otherwise is rejected.

In one implementation, in step 120, the generalized likelihood ratio test (GLRT) may be executed by the system for classifying patterns in the network traffic data and determining anomalies. Classifying patterns as normal or abnormal may involve a probability or likelihood which can be assigned to each case of new network traffic data under the BCGM statistical model. For network intrusion detection, although training data for $H_0$ hypothesis may be accessible, suitable training data for $H_1$ hypothesis can be generally difficult to obtain because of future new attacks. As a result, the GLRT can be applied to detect such intrusion where it does not require an exact pdf expression for $H_1$ hypothesis. Instead, a parametric form for the pdf expression under $H_1$ hypothesis can be assumed, and the parameters of such pdf may be estimated from the test data. The GLRT based detector is given according to the following equation.

$$L_G(x) = \frac{\max_{\theta_1} f(x, \theta_1 | H_1)}{f(x, \theta_0 | H_0)} > T \qquad (5)$$

In equation (5), x is the wavelet transform of the network traffic data and f is the pdf of such data. T is a threshold, and $\theta_0$ and $\theta_1$ are the statistical model parameters under $H_0$ and $H_1$ hypotheses, respectively. The GLRT requires knowledge of $\theta_0$, which can be estimated from the normal training data. However, the GLRT does not require knowledge of $\theta_1$, and it can be estimated from the test data. In one implementation, a joint pdf of x may be required to design the network intrusion detection based on above given formula. Due to the characteristics of the wavelet transform, however, it can be assumed that wavelet coefficients are independent identically distributed (iid). As such, the joint pdf can be obtained by multiplying marginal pdfs.

In one implementation, a logarithm can be applied to the GLRT, and the proposed intrusion detection in the wavelet domain can be obtained according to the following equation.

$$\left[ \log(L_G(x)) = \max_{\theta_1} \sum_{j=1}^{N} \log(f_{BCGM}(x_j, \theta_1 | H_1)) - \sum_{j=1}^{N} \log(f_{BCGM}(x_j, \theta_0 | H_0)) \right] > \log(T) \qquad (6)$$

In one implementation, in step 125, the network traffic data in the wavelet domain can be classified as either normal or abnormal based on comparing the calculated $\log(L_G(x))$ and the threshold $\log(T)$ in the step 120. If the value of $\log(L_G(x))$ is greater than the value of $\log(T)$, the network traffic data is classified as abnormal, and the anomaly is reported to a user in step 130. In step 135, the network traffic data can be further processed to determine whether additional detection analysis is desired, and if it is, the process can revert back to step 105.

Figure 2:
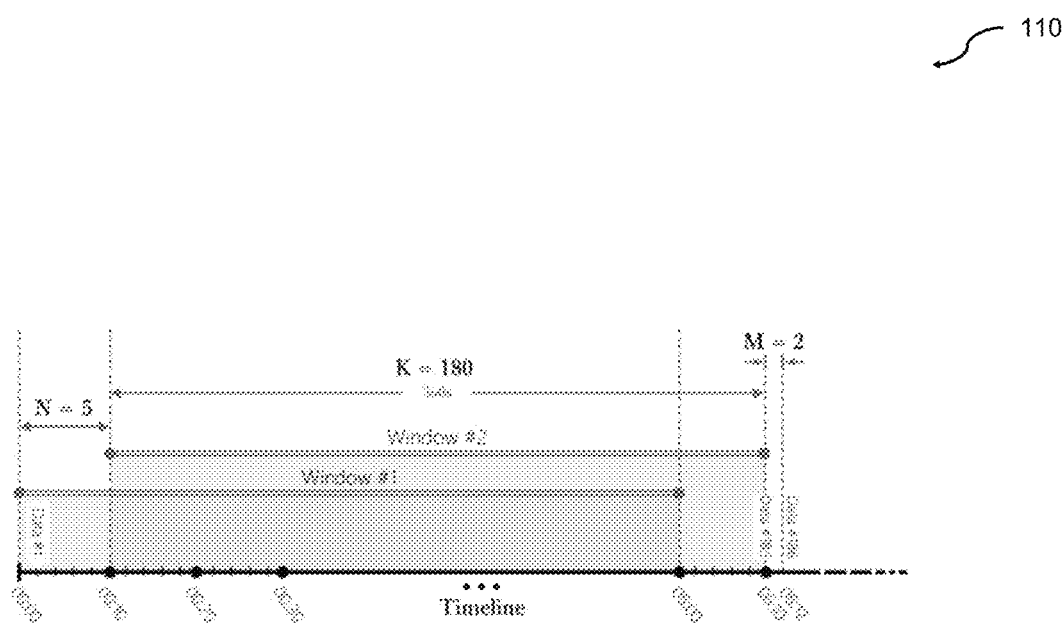
FIG. 2 shows an exemplary graph of windowing approach carried out by the improved network intrusion detection system for sniffing network anomalies.

FIG. 2 shows an exemplary graph of the windowing approach that can be used to investigate the network traffic data in the aggregate level. The windowing approach can be configured to view the network traffic data through a plurality of time windows each of which may represent a sequence of a feature including packet per second or flow per second. Each time window may be analyzed individually, and configured to have overlap with neighboring time windows to increase accuracy in specifying positions of the network anomalies and preventing sudden changes of an inference step.

In one implementation, the windowing approach may be represented by parameters, such as M, K and N in which M denotes a capturing period, i.e., one sample is captured in each M seconds from input trace; K denotes a length of each of the time windows; and N denotes a distance between starting points of two sequential time windows to determine an amount of overlap between the two. In an aspect, each time window can cover K×M seconds of the network traffic data. As one example, specific dimensions for the M, K and N parameters are shown in FIG. 2.

Figure 3:
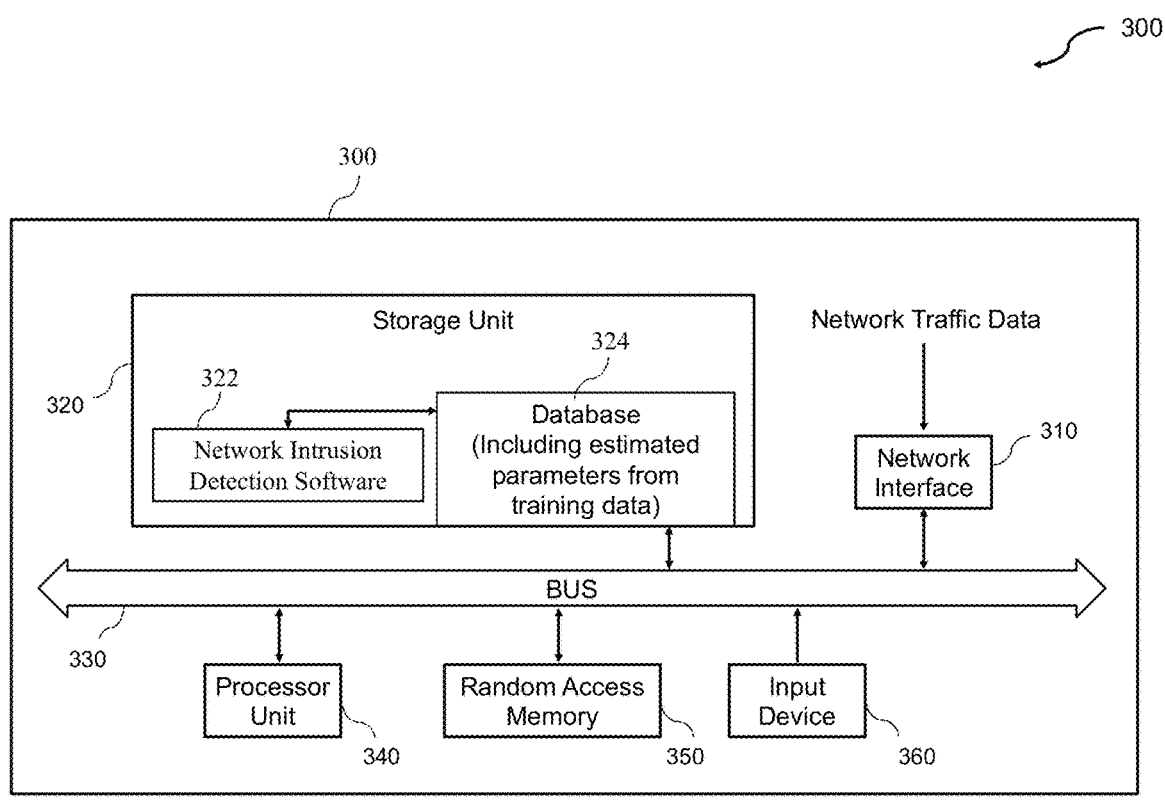
FIG. 3 is a diagram showing hardware and software components of the improved network intrusion detection system, in accordance with one or more implementations.

FIG. 3 shows a diagram of hardware and software components of the system 500 that can be configured to carry out processes discussed in FIG. 1 and FIG. 2. In this exemplary embodiment, the system 300 can be a computer device or a processing server, and may include a network interface 310, a storage unit 320, a communication bus 330, a processor unit 340, a random access memory (RAM) 350, and an input device 360.

In one implementation, the network interface 310 can be configured to sniff the network traffic data in the wavelet domain. In an aspect, the network interface 310 may include an Ethernet network interface device, a wireless network interface device, or any other suitable device that can allow the system 300 to communicate via the network.

In one implementation, the storage unit 320 may include a computer readable storage medium (or media) that can be configured to have instructions of a network intrusion detection software 322 to be stored thereon. The network intrusion detection software 322 may use a database of pre-analyzed parameters 324 to classify the network traffic as either normal or abnormal/intrusion.

In an aspect, the computer readable storage medium may be a tangible device that can include, for example, but not limited to, an electromagnetic storage device, an electronic storage device, a semiconductor storage device, an optical storage device, or any suitable combination of the foregoing. A non-exhaustive list of more specific examples of the computer readable medium that is capable of storing program instructions or digital information thereon may include: a portable computer diskette; an erasable program read-only memory (EPROM or Flash memory); a memory stick; a floppy disk; a read-only memory (ROM); a hard disk; a digital versatile disk (DVD); a mechanically encoded device, such as punch cards or raised structures in a groove having instructions recorded thereon; and any suitable combination of the foregoing. The computer readable storage medium, as used herein, is not to be construed as being transitory signals per se, such as radio waves or other freely propagating through a waveguide or other transmission media (e.g., light pulses passing through a fiber-optic cable), or electrical signals transmitted through a wire.

In one implementation, the processor unit 340 may include any suitable single- or multiple-core microprocessor of any suitable architecture, and can be configured to operate on the RAM 350 under the communication bus 330 to receive signals from the input device 360, and to run the network intrusion detection software 322 to detect anomalies. The random access memory 350 may include a static random access memory (SRAM), a dynamic random access memory (DRAM), and any suitable high-speed random access memory typical of most modern computers. The input device 360 may include one or more input devices, such as a keyboard and a mouse.

Accordingly, the improved network intrusion detection system can provide an efficient means for detecting network anomalies. Also, using the wavelet transform can capture important characteristics of the network traffic data, such as long-range dependence and self-similarity. Moreover, using the bivariate Cauchy-Gaussian mixture statistical model with a close-form expression for probability density function may increase accuracy and analytical tractability, and can facilitate fast operation and parameter estimations. As a result of the discussed advantages, the improved network intrusion detection system described herein, may not be limited to a specific setting, and can effectively be used in a variety of application domains.

The separation of various components in the examples described above should not be understood as requiring such separation in all examples, and it should be understood that the described components and systems can generally be integrated together in a single packaged into multiple systems.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

What is claimed is:

1. A system for detecting network anomalies comprising:
a computer device; and
a network anomaly detector module executed by the computer device;
wherein:
the computer device is arranged to electronically collect and sniff network traffic data in an aggregate level using a windowing approach,
the windowing approach is configured to view the network traffic data through a plurality of time windows, each of which represents a sequence of a feature including packet per second or flow per second, each time window of the plurality of time windows is analyzed individually, and configured to have overlap with a neighboring time window to increase accuracy in specifying positions of the network anomalies and preventing sudden changes of an inference step, and the network anomaly detector module is configured to execute:
a wavelet transform for capturing properties of the network traffic data,
a bivariate Cauchy-Gaussian mixture statistical model for processing and modeling the network traffic data in a wavelet domain, and
a generalized likelihood ratio test for classifying patterns in the network traffic data and detecting the network anomalies, and reporting the network anomalies to a user of the computer device.

2. The system of claim 1, wherein the computer device sniffs the network traffic data in real time.

3. The system of claim 1, wherein the computer device sniffs the network traffic data periodically.

4. The system of claim 1, wherein the wavelet transform is a multiresolution transform, and is configured to capture one or more properties of the network traffic data, including long-range dependence and self-similarity, and the wavelet transform is a multiresolution transform is configured to decompose and simplify statistics of the network traffic data into a simplified algorithm.

5. The system of claim 4, wherein the wavelet transform is Daubechies wavelets, and is configured to solve of one or more problems, at least one of which includes capturing self-similarity.

6. The system of claim 1, wherein the bivariate Cauchy-Gaussian mixture statistical model is an approximation of α-stable model, and offers a closed-form expression for probability density function to increase accuracy and analytical tractability, and to facilitate parameter estimations when compared to the α-stable model.

7. The system of claim 6, wherein compatibility between the bivariate Cauchy-Gaussian mixture statistical model and the network traffic data in the wavelet domain is investigated by at least one of comparing histogram of the network traffic data and the probability density function or applying a Kolmogrov-Smirnov test.

8. A method for detecting network anomalies comprising the steps of:
electronically sniffing network traffic data at a computer device in an aggregate level by using a windowing approach;
executing a network anomaly detector module on the computer device, the network anomaly detector module including:
(a) a wavelet transform for capturing properties of the network traffic data;
(b) a bivariate Cauchy-Gaussian mixture statistical model for processing and modeling the network traffic data in a wavelet domain; and
(c) a generalized likelihood ratio test for classifying patterns in the network traffic data and determining detecting the network anomalies; and
reporting the network anomalies to a user of the computer device,
wherein:

the windowing approach is configured to view the network traffic data through a plurality of time windows each of which represents a sequence of a feature including packet per second or flow per second, and each time window is analyzed individually, and configured to have overlap with a neighboring time window to increase accuracy in specifying positions of the network anomalies and preventing sudden changes of an inference step.

9. The method of claim 8, wherein the computer device sniffs the network traffic data in real time.

10. The method of claim 8, wherein the computer device sniffs the network traffic data periodically.

11. The method of claim 8, wherein the wavelet transform is a multiresolution transform, and is configured to capture one or more properties of the network traffic data, including long-range dependence or self-similarity, and the wavelet transform is a multiresolution transform is configured to decompose and simplify statistics of the network traffic data into a simplified algorithm.

12. The method of claim 11, wherein the wavelet transform is Daubechies wavelets, and is configured to solve one or more problems, at least one of which includes capturing self-similarity.

13. The method of claim 8, wherein the bivariate Cauchy-Gaussian mixture statistical model is an approximation of α-stable model, and offers a closed-form expression for probability density function to increase accuracy and analytical tractability, and to facilitate parameter estimations when compared to the α-stable model.

14. A computer readable medium having program instructions stored thereon for detecting network anomalies which, when executed by a computer device, causing the computer device to perform the steps of:
electronically sniffing network traffic data at the computer device;
executing a network anomaly detector module on the computer device, the network anomaly detector module including:
(a) a wavelet transform for capturing properties of the network traffic data;
(b) a bivariate Cauchy-Gaussian mixture statistical model for processing and modeling the network traffic data in the wavelet domain; and
(c) a generalized likelihood ratio test for classifying patterns in the network traffic data and determining anomalies; and
reporting the anomalies to a user of the computer device,
wherein the bivariate Cauchy-Gaussian mixture statistical model is an approximation of α-stable model, and offers a closed-form expression for probability density function to increase accuracy and analytical tractability, and to facilitate parameter estimations when compared to the α-stable model.

15. The computer readable medium of claim 14, wherein a windowing approach is used to electronically sniff the network traffic data and the windowing approach is configured to view the network traffic data through a plurality of time windows each of which represents a sequence of a feature including packet per second or flow per second.

\* \* \* \* \*